United States Patent

Suzuki

[11] Patent Number: 5,096,028
[45] Date of Patent: Mar. 17, 1992

[54] BRAKE BOOSTER

[75] Inventor: Haruo Suzuki, Higashimatsuyama, Japan

[73] Assignee: Jidosha Kiki Co., Ltd., Tokyo, Japan

[21] Appl. No.: 449,030

[22] Filed: Dec. 12, 1989

[30] Foreign Application Priority Data

Dec. 20, 1988 [JP]  Japan .................. 63-321504

[51] Int. Cl.⁵ .......................................... B60T 13/52
[52] U.S. Cl. .................... 188/357; 91/376 R
[58] Field of Search .................... 303/4, 12, 114; 188/356, 357; 91/376 R, 369.1, 369.2, 369.3, 369.4; 74/102; 60/547.1; 403/348, 349

[56] References Cited

U.S. PATENT DOCUMENTS

| | | | |
|---|---|---|---|
| 3,974,741 | 8/1976 | Ohmi ........................ | 91/376 R |
| 4,487,105 | 12/1984 | Harrison ................... | 91/376 R |
| 4,632,015 | 12/1986 | Wilson ...................... | 74/102 X |
| 4,658,704 | 4/1987 | Mori et al. ................ | 91/376 R |
| 4,756,638 | 7/1988 | Neyret ....................... | 403/349 |
| 4,819,996 | 4/1989 | Belart et al. ............ | 188/356 X |
| 4,843,948 | 7/1989 | Sugiura et al. ......... | 91/376 R V |
| 4,893,426 | 1/1990 | Bixler ........................ | 403/348 |

FOREIGN PATENT DOCUMENTS 2112886  7/1983  United Kingdom .............. 91/369.2
2109884  9/1983  United Kingdom .............. 91/369.2

Primary Examiner—Matthew C. Graham
Attorney, Agent, or Firm—Varndell Legal Group

[57] ABSTRACT

In the negative pressure booster equipment according to the present invention, a valve plunger 17 and an input shaft 18 are incorporated in a single member. Also, the axial length of the guide 17a of the valve plunger in relation to the valve body 4 is set to such size as to allow the angle of the maximum inclination of the input shaft 18 during operation. Further, a retainer 27 to support a spring 33 of a control valve 22 is removably mounted on the input shaft 18 from the atmospheric air inlet of the valve body 4. Accordingly, in the case of valve disc 24 is to be replaced, valve disc 24 and other rubber products can be readily replaced by removing the retainer 27 without disassembling the valve plunger 17 or the input shaft 18 from the valve body 4. Because the valve plunger 17 and the input shaft 18 are incorporated, the caulking process for the members 17 and 18 are not required. Because the guide 17a of the valve plunger 17 requires the guding function in lesser degree than the conventional equipment, the overall length of the equipment can be shortened.

6 Claims, 2 Drawing Sheets

BRAKE BOOSTER

BACKGROUND OF THE INVENTION

The present invention relates to a negative pressure booster equipment to be used for brake booster, and more particularly, to a negative pressure booster equipment, in which a retainer to support the spring of control valve is provided on an input shaft.

For the vehicles such as passenger car, negative pressure booster equipment utilizing negative pressure has been conventionally used for the brake booster. A general negative pressure booster equipment is described, for example, in the Japanese Provisional Patent Publication Sho 58-202146.

In this negative pressure booster equipment, a control valve furnished in the bore of valve body is switched over through a valve plunger when input shaft is operated. Thus, atmospheric air is introduced into variable pressure chamber, and power piston is operated by the pressure difference between variable pressure chamber and constant pressure chamber.

In such negative pressure booster equipment, the input shaft is swinged simultaneously with the axial movement when the brake pedal is depressed. The input shaft and the valve plunger must be connected in order to absorb this swing. For this purpose, the valve plunger and the input shaft are normally connected with each other in such manner that they can be rotated relative to each other, and this is usually done by caulking.

In the control valve, springs are furnished to fix the valve disc on valve body or to apply force on the valve disc toward the direction of valve seat. Further, a retainer is engaged on the input shaft in order to support these springs.

In such negative pressure booster equipment, however, the valve plunger and the input shaft cannot be easily separated because these are connected by caulking connection, and the valve plunger cannot be removed easily from the valve body. Also, the retainer supporting the springs of control valve cannot be removed from the atmospheric air inlet of the valve body. Accordingly, it is very difficult to remove only the valve disc of the control valve. When the valve disc, usually made of rubber easily deteriorated, is to be replaced, for instance, the subassembly incorporating valve plunger, input shaft and control valve on valve body had to be replaced in the past. This means the replacement of the components, which need not be replaced yet.

In the conventional general negative pressure booster equipment, caulking process is required because valve plunger and input shaft are connected by caulking. This resulted in the higher number of fabrication processes and has hindered the automation of the assembling process.

Further, the axial length of the valve plunger guide must be relatively long because valve plunger must be guided in relation to the valve body, and this means longer overall length of the equipment.

SUMMARY OF THE INVENTION

The object of the present invention is the easy replacement of the components of the control valve.

Another object of this invention is to shorten the overall length of the equipment and to reduce the number of the fabrication processes.

To attain these objects, the present invention proposes to incorporate valve plunger and input shaft in a single member. Also, the axial length of the guide of valve plunger in relation to valve body is set to such length that the angle of the maximum inclination of the input shaft is allowed during operation. Further, a retainer to support the springs of control valve is removably mounted on input shaft from the atmospheric air inlet of valve body.

In the negative pressure booster equipment according to the present invention, the retainer to support or to apply force on the valve disc is removably mounted on the input shaft from the atmospheric air inlet of the valve body, and only the valve disc can be removed and replaced without disassembling valve plunger or input shaft from valve body. Accordingly, there is no need to replace the subassembly incorporating control valve, valve plunger and input shaft on valve body, and this eliminates the waste of time and labor.

Because valve plunger and input shaft are incorporated in a single member and the axial length of the guide of valve plunger is shortened, the overall length of the equipment can be shortened. This means the elimination of the caulking process and the reduction of the fabrication processes. The elimination of the caulking process makes it possible to automate the assembling process.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the following, the embodiments of the present invention will be described in connection with the drawings.

Figure 1:
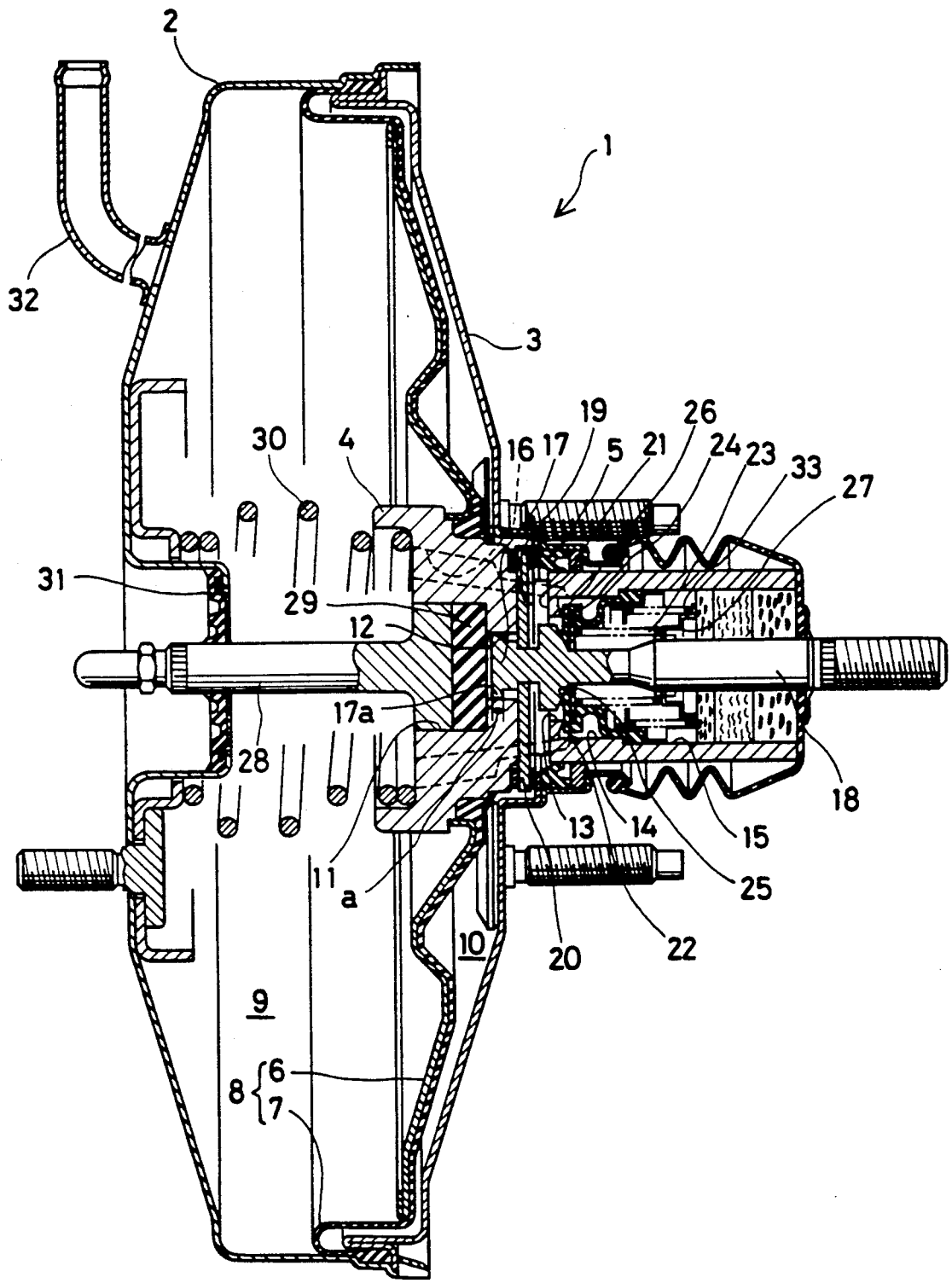
FIG. 1 is a longitudinal sectional view of an embodiment, in which the negative pressure booster equipment according to the present invention is applied for brake booster.

As shown in FIG. 1, the brake booster equipment 1 is provided with a front shell 2 and a rear shell 3, and the front shell 2 and the rear shell 3 are joined together, for example, by bayonet joint.

A valve body 4 is furnished to pass through the rear shell 3, and the valve body 4 is supported airtightly and slidably by the rear shell 3 and the sealing member 5. A power piston member 6 disposed in the space between the shells 2 and 3 is connected to the valve body 4. On the backside of the power piston member 6, a diaphragm 7 is furnished between the shells 2 and 3 and the valve body 4. The power piston 8 consists of the power piston member 6 and the diaphragm 7, and the space in the shells 2 and 3 is divided into a constant pressure chamber 9 and a variable pressure chamber 10 by the power piston 8.

On the valve body 4, a recessed portion 11 opening to the constant pressure chamber 9 is provided, and a first bore 12 opening to the recessed portion 11 is furnished. Continuing to this first bore 12 and facing backward (rightward in the drawing), a second bore 13, a third bore 14 and a fourth bore 15 opening to the atmospheric air are provided.

The valve body 4 is further furnished with an axial passage 16, communicating the constant pressure chamber 9 and the third bore 14.

In the first bore 12 of the valve body 4, the front end of the valve plunger 17, i.e. a guide 17a is movably engaged. The right end of the valve plunger 17 is an input shaft 18, which is coupled with the brake pedal (not shown). Namely, the valve plunger 17 and the input shaft 18 are incorporated in a single member. The axial length "a" of the guide 17a of the valve plunger 17 is set relatively short so that the valve plunger 17 and the input shaft 18 are inclined more than the maximum inclination angle of the input shaft when brake pedal is depressed. The maximum inclination angle of the input shaft is the maximum angle at which the input shaft is moved and inclined, when the brake pedal is depressed to its maximum allowable depressing angle.

On the valve body 4, a bore 19 of radial direction is formed orthogonally to the second bore 13. The key member 20 passes through this bore 19 and is engaged movably to axial direction in relation to the valve plunger 17. On the valve plunger 17, the key member 20 can be moved to axial direction only by the width (i.e. axial length) of the bore 19. This key member 20 prevents the valve plunger 17 from moving out of the valve body 4.

Further, the valve body 4 is provided with a passage 21 opening to the variable pressure chamber 10 and orthogonal to the second bore 13.

Between the second bore 13 and the third bore 14 of the valve body 4, a control valve is furnished. This control valve 22 comprises a valve disc 24, which is mounted on the valve body 4 by the spring 33 disposed between it and the input shaft 18 and is normally urged toward the valve plunger 17 by resilient force of the spring 23 disposed between it and the input shaft 18, a first valve seat 25 provided at the right end of the valve plunger 17, and a second valve seat 26 provided on the valve body 4. When the valve disc 24 is seated on the first valve seat 25 and is separated from the second valve seat 26, the control valve 22 provides the communication between the constant pressure chamber 9 and the variable pressure chamber 10 and shuts off the communication between the variable pressure chamber 10 and the atmospheric air. When the valve disc 24 is separated from the first valve seat 25 and is seated on the second valve seat 26, the control valve shuts off the communication between the constant pressure chamber 9 and the variable pressure chamber 10 and provides the communication between the variable pressure chamber 10 and the atmospheric air.

Figure 2:
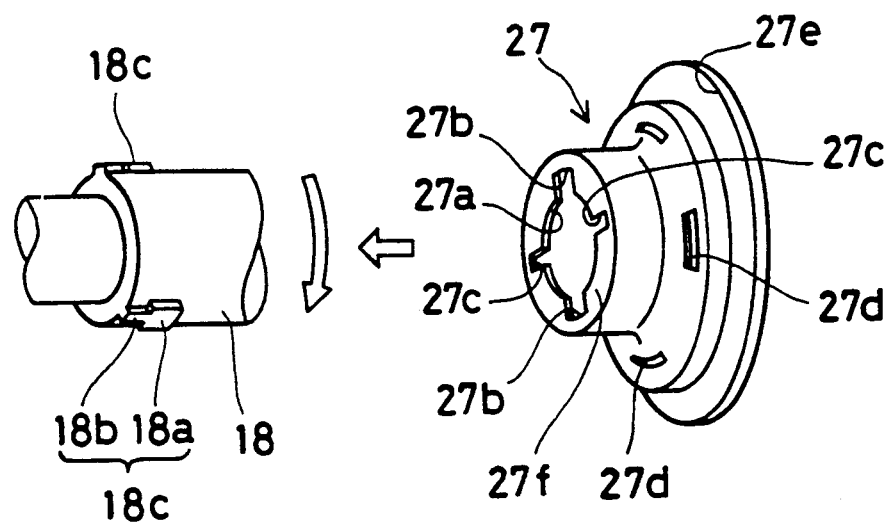
FIG. 2 is a disassembled perspective views of the retainer and the input shaft to support the springs of the control valve used for the booster equipment.

The spring 33 to fix the valve disc 24 on the valve body 4 and the spring 23 to urge the valve disc 24 are supported by a retainer 27 mounted on the input shaft 18. As shown in FIG. 2, the retainer 27 is fabricated in the form of a crown, by pressing a flat plate. On the axial projection at the center of the retainer 27, a circular hole 27a is provided, and the circular hole 27a is in such size that the input shaft 18 is passed through it.

This hole 27a is furnished with a pair of the first slits 27b and 27b with relatively large width at the positions opposing to each other. At the positions different from those of this pair of the first slits 27b and 27b, a pair of the second slits 27c and 27c with smaller width than the first slits is furnished. On the other hand, on the outer periphery of the input shaft 18, a stepped projection 18c comprising a first portion 18a with larger width and a second portion 18b with smaller width disposed at the opposing positions is provided. The first portion 18a has such width that the first portion 18a can pass through the first slits 27b of the retainer 27, but cannot pass through the second slits 27c. The second portion 18b has such width that it can pass through the second slits 27c. Further, the retainer 27 is furnished with several holes 27d, into which the tool is inserted during assembling or disassembling. The flange-like portion at the right end of the retainer 27 forms the support 27e for the spring 33, and the left end forms the support 27f for the spring 23.

To assemble the retainer 27 on the input shaft 18, the retainer 27 is inserted from the right end of the input shaft 18, as shown in FIG. 2, so that the input shaft 18 passes through the hole 27a and the first slits 27b passes through the first portion 18a of the projection 18c. Next, the input shaft 18 is rotated against the retainer 27, and the second groove 27c is aligned with the second portion 18b. When the retainer 27 is moved toward reverse direction, i.e. toward right by the force of the spring 33, the second slits 27c of the retainer 27 engages with the second portion and the peripheral rotation is restricted, and the rightward movement is limited as it hangs on the first portion 18a. Thus, the retainer 27 is mounted on the input shaft 18.

On the recessed portion 11 of the valve body 4, the right end portion with larger diameter of the output shaft 28 is slidably engaged. In the recessed portion 11, a reaction disc 29 is disposed between the valve body 4 and the output shaft 28. A certain gap is furnished between this reaction disc 29 and the valve plunger 17.

The valve body 4 is normally urged toward right by a return spring 30 so that it is returned to the non-operating position.

The left end of the output shaft 28 is airtightly and slidably supported by a sealing member 31 and projects from the front shell 2 outwardly, and the left end is coupled with the piston of the master cylinder (not shown) mounted on the front shell 2.

The valve body 4 and the power piston 8 connected with it are normally maintained at the non-operating position by a return spring 30 as shown in the drawing. In this non-operating condition, the key member 20 touches the inner surface of rear shell 3, and this restricts the rightward movement of the valve plunger 17 and maintains the valve plunger 17 at the backward limit position. When the input shaft 18 is not operated, the key member 20 is at the advanced position in relation to the valve body 4. In this case, the valve disc 24 is seated on both the first valve seat 25 and the second valve seat 26, and the variable pressure chamber 10 is shut off from both atmospheric air and the constant pressure chamber 9. Therefore, when the input shaft 18 advances and the valve plunger 17 is operated during the braking operation, the valve disc 24 is immediately separated from the first valve seat 25, and the variable pressure chamber 10 and the atmospheric air are communicated with each other.

The constant pressure chamber 9 is communicated, for example, with the intake manifold of the engine (not shown) through a negative pressure inlet pipe 32 mounted in the front shell 2. Accordingly, negative pressure is always introduced into the constant pressure chamber 9.

Next, description will be given on the operation of this embodiment.

When the brake booster equipment 1 is at the non-operating position as shown in the drawing, the pressure in the variable pressure chamber 10 is a little higher than that of the constant pressure chamber 9 and it is approximately balanced with the pressure added by resilient force of the return spring 30.

When brake pedal is depressed for braking, the input shaft 18 advances toward the valve body 4. As the input shaft 18 advances, the valve plunger 17 moves forward in relation to the key member 20 and the valve body 4. When the valve plunger 17 moves forward, the first valve seat 25 is separated from the valve disc 24 of the control valve 22. Thus, the air with atmospheric pressure flows into the variable pressure chamber 10 through the fourth bore 15, the gap between the valve disc 24, the first valve seat 25, the second bore 13 and the passage 21.

By the air entering the variable pressure chamber 10, the power piston 8 is operated, and the valve body 4 moves forward. The brake booster equipment 1 generates the output through the output shaft 28 and operates the piston of master cylinder. However, the braking effect is not immediately provided because of the resistances in the braking circuit after the master cylinder. In the early stage of this operation, the valve plunger 17 and the reaction disc 29 do not engage with each other because a certain gap is formed between the reaction disc 29 and the valve plunger 17.

When the above resistances are overcome, the braking operation is started. Then, the reaction disc 29 and the valve plunger 17 engage with each other because the gap between the reaction disc 29 and the valve plunger 17 is eliminated by the deformation of the reaction disc 29. Accordingly, the reaction force caused by braking is transmitted to the driver through output shaft 28, reaction disc 29, valve plunger 17 and input shaft 18. In this case, the output is already increased considerably compared with the input, and the so-called jumping effect occurs.

When brake pedal is released to cancel the braking operation, input shaft 18, valve plunger 17 and key member 20 move backward, i.e. rightward in relation to the valve body, until the key member 20 touches the rear end wall of the bore 19. With the backward movement of valve plunger 17, the first valve seat 25 touches the valve disc 24, and the variable pressure chamber 10 and the atmospheric air are shut off. At the same time, the valve disc 24 is separated from the second valve seat 26, and the variable pressure chamber 10 is communicated with the constant pressure chamber 9. As the result, the air in the variable pressure chamber 10 flows into the constant pressure chamber 9 and is further introduced into the intake manifold through the negative pressure inlet pipe 32. In this case, the valve plunger 17 is at the most backward position in relation to the valve body 4, and the gap between the valve disc 24 and the second valve seat 26 is increased to the maximum. Then, the air in the variable pressure chamber 10 rapidly flows. As the result, the valve body 4 and the power piston 8 are rapidly moved backward by resilient force of the spring 30.

When the key member 20 touches the inner surface of the rear shell 3, the valve plunger 17 and the key member 20 do not move any more, but the valve body 4 continues to move backward. When the second valve seat 26 touches the valve disc 24, the air in the variable pressure chamber 10 stops to flow toward the constant pressure chamber 9, and the power piston 8 do not move backward any more and stay at the backward limit position. Thus, the valve body 4 and the valve plunger 17 are at the initial non-operating position as shown in the drawing.

To assemble valve plunger 17, valve disc 24 and springs 23 and 33 on the valve body 4 in the negative pressure booster equipment of this invention as described above, the assembly of valve plunger 17 and input shaft 18 is first inserted into the bore of the valve body 4. Then, the valve disc 24 is introduced into the input shaft 18 from the right, i.e. from the air inlet of the valve body 4, and is inserted into the bore of the valve body 4. next, after the springs 23 and 33 are inserted, the retainer 27 is mounted on the input shaft from the air inlet of the valve body 4 as described above.

In case the valve disc 24 is to be replaced, the retainer should be removed from the input shaft 18 in reverse sequence to the assembling, and the valve disc 24 can be easily removed. In this case, there is no need to remove valve plunger 17.

The valve plunger 17 and the input shaft 18 are incorporated in a single member, and the axial length "a" of the guide of the valve plunger 17 is relatively shortened in order to allow the rotation of the input shaft 18 when brake pedal is pressed. Thus, it is possible to shorten the overall length of the equipment. Also, the caulking process as conventionally required for the engagement of valve plunger 17 and input shaft 18 is not required, and this reduces the number of the fabrication processes.

The present invention is not limited to the embodiment as described above, and it is obvious that various variants of the design can be contemplated.

For example, description has been given on the negative pressure booster equipment, in which the valve disc 24 is seated on both the first and the second valve seats 25 and 26 during non-operating condition and the variable pressure chamber 10 is shut off from both the constant pressure chamber 9 and the atmospheric air. However, the invention can be applied to the negative pressure booster equipment, in which the valve disc 24 is separated from the second valve seat 26 and the variable pressure chamber 10 is communicated with the atmospheric air.

Also, the valve body 4 and the power piston member 6 are provided separately in the above embodiment, whereas the invention can be applied to the negative pressure booster equipment, in which these are incorporated in a single member.

Further, description has been given in the above embodiment on the case where the negative pressure booster equipment of this invention is applied to a brake booster, while the present invention can be applied to the other booster equipment such as clutch booster.

As it is evident from the above description, a retainer to support or to push the valve disc is removably mounted on the input shaft from the air inlet of the valve body in the negative pressure booster equipment of this invention, and it is possible to disassemble and replace only the valve disc without removing valve plunger or input shaft from the valve body. Therefore, there is no need to replace the subassembly, in which control valve, valve plunger, and input shaft are incorporated on valve body. This eliminates the waste of time and labor.

Because the valve plunger and the input shaft are incorporated in a single member and the axial length of the guide of the valve plunger is shortened, it is possible to shorten the overall length of the equipment and to eliminate the conventional caulking process. This reduces the number of the fabrication processes. The elimination of the caulking process provides the possibility toward the automation of the assembling process.

What we claim is:

1. A negative pressure booster equipment comprising a valve body movably disposed in a space formed by a front shell and a rear shell and airtightly and slidably passing through said rear shell, a power piston coupled with said valve body and dividing said space into a constant pressure chamber where negative pressure is introduced and a variable pressure chamber where atmospheric air is introduced during operation, a valve plunger slidably mounted on said valve body, an input shaft coupled with said valve plunger and movably mounted in said valve body, and a control valve provided in said valve body for switching between said atmospheric air and said constant pressure chamber when operated by said valve plunger, wherein said valve plunger and said input shaft are incorporated in a single member, said valve plunger has a guide slidably received in a bore of said valve body, an axial length of said guide of said valve plunger is shorter than an axial length of said bore, and a retainer for supporting a spring of said control valve is removably mounted on said input shaft from an atmospheric air inlet of said valve body, said retainer being provided with a first and a second slit having different width, and said input shaft being provided with a stepped projection.

2. A negative pressure booster according to claim 1, wherein said first slit has larger width than said second slit of said retainer, and said stepped projection of said input shaft can pass through said first slit, but cannot pass through said second slit.

3. A negative pressure booster according to claim 2, wherein said stepped projection of said input shaft is inserted through said first slit of said retainer, said input shaft is rotated against said retainer, and said second slit engages with the shoulder of said stepped projection when said second slit is aligned with said stepped projection for preventing said retainer from disengaging from said input shaft.

4. A negative pressure booster according to claim 1, wherein said retainer has two pairs of first and second slits, each respective first slit having a larger width than a corresponding said second slit, and said input shaft is provided with a pair of stepped projections.

5. A negative pressure booster as claimed in claim 1, wherein said retainer has two pairs of first and second slits, each respective first slit having a larger width than a corresponding second slit, and said input shaft has a pair of stepped projections which respectively pass through said first slits but cannot respectively pass through said second slits.

6. A negative pressure booster as claimed in claim 1, wherein said retainer has two pairs of first and second slits, each respective first slit having a larger width than a corresponding second slit, and said input shaft is provided with a pair of stepped projections, said stepped projections are respectively inserted through said first slits, said input shaft is rotated against said retainer, and said second slits respectfully engaged with a shoulder of said stepped projections when said second slits are respectfully aligned with said stepped protections for preventing said retainer from disengaging from said input shaft.

* * * * *